J. W. PATTERSON.

Improvement in Coffee and Tea Pot.

No. 121,126.

Patented Nov. 21, 1871.

J. W. PATTERSON'S
Improved Coffee and Tea Pot

Witnesses: Charles J. Pitman, Jno. L. Frolic

J. Willard Patterson, Inventor

UNITED STATES PATENT OFFICE.

JAMES WILLARD PATTERSON, OF NEW YORK, N. Y., ASSIGNOR TO JOHN ASHCROFT AND SARAH ELLEN PATTERSON, OF SAME PLACE.

IMPROVEMENT IN COFFEE-POTS.

Specification forming part of Letters Patent No. 121,126, dated November 21, 1871; antedated November 20, 1871.

*To all whom it may concern:*

Be it known that I, JAMES WILLARD PATTERSON, of the city, county, and State of New York, have invented certain new and useful Improvements in Coffee and Tea-Pots, of which the following is a specification:

My invention consists of a jacket having an open bottom, and in suspending therein, by means of a perforated collar, a coffee or tea-pot, and having a steam or vapor-chamber which surrounds the sides and top of the inner pot; and in connection therewith a separate steam-generating base-pan or bottom having communication with the surrounding and top chambers of the inner pot, so that the steam will rise from the heater and envelop the inner pot, and heat the latter to the required temperature for steeping coffee and tea without the solution reaching the boiling point; and the pot being separate from the heater may be used upon the table without the heater.

Figure 2:
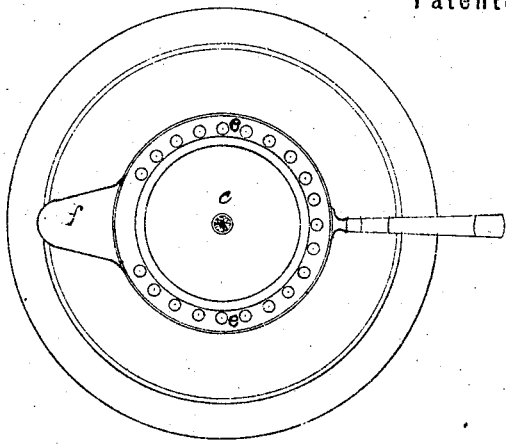
Figure 1:
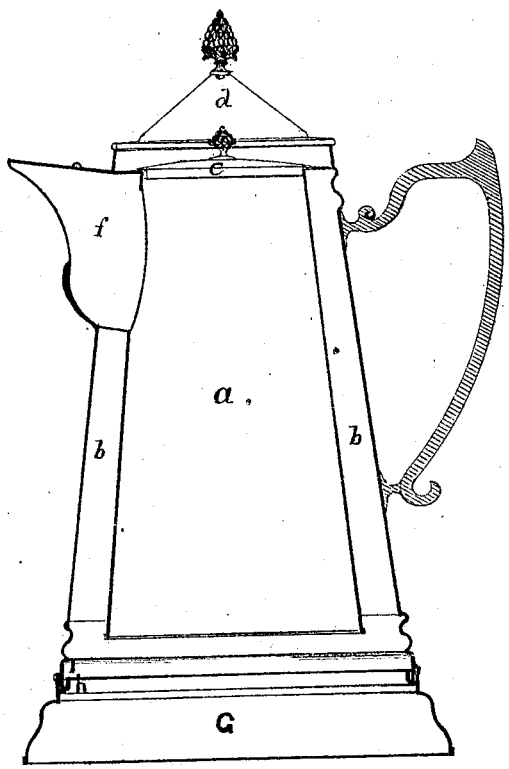

In the drawing, Figure 1 represents a vertical section of a coffee-pot embracing my invention, and Fig. 2 a horizontal section of the same, showing the perforated collar.

The removable pan or steam-generator G is shown in the drawing as having the largest possible heating surface for the bottom, and a groove or water-joint, $h$, to receive the bottom $i$ of the jacket, prevents the escape of the steam and forms a tight communication between the chamber of the generator G and the chamber $b$ which surrounds the inner pot, as well as with the top chamber of the cover $d$ through the perforations $e'$ in the suspending-collar $e$, thereby putting every part of the suspended vessel in communication with the steam-generator, and distributing an equal amount of heat to every part of the pot $a$, within which the volatilization of the coffee and tea is effected. The cover $c$ fits closely upon the suspended pot $a$ to prevent the entrance of the steam to the solution; and the cover $d$ fits closely upon the pot-jacket to confine the vapor around the suspended vessel, thus preventing evaporation of the coffee, and also avoiding any atmospheric action upon the solution in the process of steeping. The perforated collar $e$ serves to connect and suspend the interior vessel or pot $a$, and its perforations to connect the chamber of the cover $d$ with that which surrounds the pot and directly with the steam-generator. The spout $f$ is attached to the inner suspended vessel and passes through the jacket.

By my improvement the air and dry heat are excluded from the solution, thus avoiding the chemical changes which they produce, and which so quickly deteriorates coffee, and renders it stale and discolored and void of aromatic flavor.

It is obvious that the open-bottom jacket will allow the vessel to be fitted upon any suitable heater or steam-generator, and in this respect obtain the advantage of an open heating-chamber to a suspended pot.

Having described my invention, I claim—

1. The combination of an open removable bottom or steam-generator, G, with a jacket having an open bottom, $i$, a surrounding chamber, $b$, communicating with said generator, and a suspended pot, $a$, as and for the purpose described.

2. The perforated collar $e$ for suspending the inner pot, and forming a communication of the top chamber $d$ with the surrounding chamber $b$ and the steam-generator, as described.

3. In a coffee-pot having a separate removable bottom or steam-generator and a jacket with an open bottom, the water-joint $h\,i$ to seal the steam-generator with the jacket and form a closed chamber therewith, as described.

4. The combination of the removable bottom or steam-generator G, the jacket, the sealing-joint $h\,i$, the inner suspended vessel $a$, perforated collar $e$ with the upper chamber and closed covers $c$ and $d$, the several parts being constructed and arranged as described.

JAS. WILLARD PATTERSON.

Witnesses:
A. HOPKINS,
M. H. DANIELS.

(136)